United States Patent

[11] 3,631,879

[72] Inventor Ralph H. Larson
Edina, Minn.
[21] Appl. No. 847,649
[22] Filed Aug. 5, 1969
[45] Patented Jan. 4, 1972
[73] Assignee The Bendix Corporation

[54] PNEUMATIC OSCILLATOR
9 Claims, 2 Drawing Figs.

[52] U.S. Cl............................................. 137/119,
137/624.14, 73/515, 235/201 ME
[51] Int. Cl........................................................G01p 15/02
[50] Field of Search........................................... 73/515,
516; 235/201; 137/119, 624.14

[56] References Cited
UNITED STATES PATENTS
3,151,623 10/1964 Riordan........................ 137/112
3,263,505 8/1966 Grunwald..................... 73/515
3,421,549 1/1969 Webb............................ 137/624.14
3,469,456 9/1969 Riordan et al. ............... 235/201
3,504,692 4/1970 Goldstein..................... 235/201

OTHER REFERENCES
Von Den Honert " Pneumatic Oscillater" IBM Tech. Disclosure Bulletin, Vol. 7, No. 6, Nov. 1964.

*Primary Examiner*—Richard C. Queisser
*Assistant Examiner*—Herbert Goldstein
*Attorneys*—Raymond J. Eifler and Plante, Arens, Hartz, Hix and Smith ABSTRACT: A fluid oscillator has a movable cylinder dividing a cavity into two chambers. Passages in the cylinder connect the inlet with each of the chambers. Outlets in each of the chambers are located so that motion of the cylinder alternately increases the size of one of the outlet openings while decreasing the size of the other outlet opening.

PATENTED JAN 4 1972

3,631,879

RALPH H LARSON
INVENTOR.

BY *Raymond J. Eifler*
ATTORNEY

PNEUMATIC OSCILLATOR

BACKGROUND OF THE INVENTION

The invention relates to fluid systems in general, and more specifically to fluid oscillators and fluid oscillators used as accelerometers.

Fluids in motion are widely used in military and industrial systems. Machine tools, steam engines, internal combustion engines, rocket motors and many other devices depend upon precise and timely control of moving fluids for proper operation. Application of the theories of pneumatics and hydraulics has led to a wide variety of rugged, reliable, fluid-actuated systems.

Ideally, a fluid oscillator has no moving parts other than the moving fluid (e.g. U.S. Pat. No. 3,320,966). However, certain systems require fluid oscillators having parameters that can be obtained only from a hybrid device; (e.g. fluid device containing a moving part or parts).

SUMMARY OF THE INVENTION

To meet the requirements of certain fluid systems, I have invented a fluid oscillator (for compressible and incompressible fluids) which comprises: A housing having a chamber for receiving and exhausting fluid, and a piston located within the chamber that oscillates longitudinally (on its axis) by virtue of the pressure forces generated by the fluid flowing through the housing chamber. The invention is characterized by the fact that one of orifices for passing fluid through the housing chamber varies its movement (position) of the piston to cause the piston to oscillate. The above combination produces a stable settable oscillator for particular volumes and restrictions within the combination. However, by proper selection of restrictions, volume sizes and ratios, the oscillator may be used as an accelerometer because the frequency of oscillations can be made to vary with respect to the changes in velocity of the oscillator. Further, the oscillator can operate effectively as an analog-to-frequency converter over a limited range of input pressures because changes in input pressure cause a change in the frequency of oscillation at the outputs.

A major advantage of an oscillating accelerometer over a proportional device is that it is insensitive to temperature. Also, the oscillating accelerometer is less expensive to fabricate and much easier to assemble than thrust bearing accelerometers that are presently in use (e.g. U.S. Pat. Nos. 3,433,080 and 3,444,814).

Accordingly, it is an object of this invention to provide a fluid oscillator having a moving part or parts to cause the fluid flow to vary at the output. It is another object of this invention to provide an oscillator which has two output signals which are 180° out of phase.

It is a further object of this invention to provide a device which would operate as an analog-to-frequency converter.

It is still a further object of this invention to provide a stable fluid oscillator having a moving part or parts.

It is yet another object of this invention to provide a fluid oscillator capable of functioning as an accelerometer.

It is still another object of this invention to provide an oscillator that changes its frequency in response to changes in acceleration. It is still a further object of this invention to provide a fluid system for measuring and indicating changes in velocity.

The above and other objects and features of the invention will become apparent from the following detailed description taken in connection with the accompanying drawings which form a part of this specification.

DESCRIPTION OF THE PREFERRED EMBODIMENT

Figure 1:
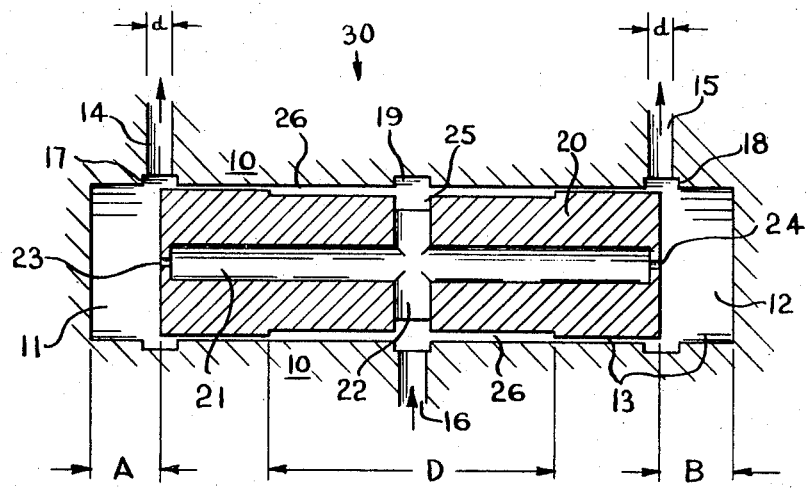
FIG. 1 shows a cross-sectional view of one embodiment of the oscillator.

Referring now to FIG. 1 which shows a cylinder 20 located within a housing 10. The cylinder 20, is the preferred body shape, but other shapes, e.g. rectangular, may be used, has a first passage (radial passage 22) for receiving fluid which extends through the width of the cylinder 20, preferably through a diameter, and a second passage (axial passage 21) for exhausting fluid which extends through the length of the cylinder, preferably along the axis. The axial passage 21 terminates at the ends of the cylinder 20 in orifices 23 and 24. The diameters of the orifices 23, 24 are the same size, but smaller than the diameter of the passage and are sized according to the flow rate desired from the axial passage 21. The cylinder 20 floats on a fluid step-bearing 26 (having a length "D") when fluid is introduced at the housing inlet 16 and is capable of oscillating axially by virtue of the forces generated by the fluid flow through the orifices 23, 24 into the chambers 11, 12. An example of a similar fluid (air) bearing may be found in U.S. Pat. No. 3,432,213. For proper distribution of fluid around the cylinder 20, it is preferred that the cylinder have a continuous groove 25 around the outside surface. The groove 25 shown is rectangular in shape but other shapes, e.g. circular, could be used. The radial passage 22, which extends through the cylinder 20, communicates with the groove 25. The housing 10 has a cavity or interior chamber 13, an inlet 16 for receiving fluid, and a first and second outlet 14, 15, having preferably the same outlet diameter "D" for exhausting fluid. The inlet 16 is located centrally of the housing 10, and communicates with radial passage 22 of the cylinder 20. For proper distribution of fluid to the fluid step-bearing 26 and the radial passage 22, the housing 10 has a groove 19 around the inside of the chamber which is similar to and aligned with the groove 25 of the cylinder 20, when the cylinder is centered in the housing 10. The housing groove 19 communicates with the inlet means 16. In the preferred embodiment, the housing has grooves 17 and 18 which are aligned with the openings of the outlets 14 and 15. The outlets 14, 15 are spaced from each other and the two outputs therefrom are 180° out of phase. In this embodiment, each outlet 14, 15 is spaced an equal distance from inlet 16 with the distance between the centerlines of the two outlets 14, 15 equal to the length of the cylinder 20 so that the effective size of the openings in the inlets 14, 15 varies as the cylinder 20 oscillates.

The cavity 13 is further divided into two chambers 11, 12 by cylinder 20. The first chamber 11 communicates with the first outlet 14 and the orifice 23 of axial passage 21. The second chamber 12 communicates with the second outlet 15 and the orifice 24 of axial passage 21. Both chambers 11 and 12 have volumes and pressures which vary inversely with respect to each other with axial movement of cylinder 20.

The distance A and B between the sidewalls of the chamber 10 and the ends of the cylinder 20 varies as the cylinder oscillates. Therefore, the volumes of chambers 11 and 12 vary also. Cylinder 20 which has a diameter smaller than the diameter of the cavity 13 (or smaller cross-sectional area for other shapes) is oscillatable on its axis, causing the volumes of the chambers 11, 12 to change accordingly. The axial passage 21 of the cylinder communicates with the radial passage 22 of the cylinder and the first and second outlets 14, 15 of the housing 10 through chambers 11 and 12. The symmetry of the oscillator construction provides two output signals 180° out of phase from the outlets 14, 15.

Figure 2:
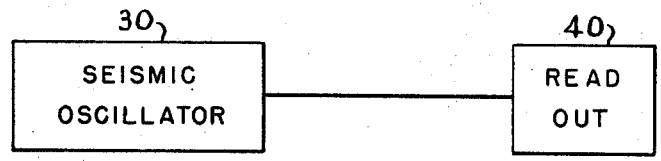
FIG. 2 shows a block diagram of the system which utilizes the oscillator, shown in FIG. 1, as an accelerometer.

FIG. 2 shows a block diagram of a system for determining acceleration which includes a seismic oscillator 30 which is of the type described in FIG. 1 (changes frequency with respect to changes in velocity) and a readout device 40 which includes means for producing an indication of acceleration from the change of frequency of the oscillator.

PRINCIPLES OF OPERATION

Referring now to FIG. 1, the apparatus described operates as a fluid oscillator as follows: Fluid enters inlet 16, flows around the cylinder or piston 20, causing the cylinder to be floated on fluid-bearing 26 and into radial passage 22 of piston 20, out of orifices 23, 24, of axial passage 21, into chambers 11 and 12, and out of outlets 14, 15. When fluid enters the housing inlet 16, the piston 20 moves in a direction that decreases the size of one of the chambers 11 and the effective opening in one of the outlets 14 and increases the pressure in the chamber 11. Simultaneously, the size of the other chamber 12 increases and the pressure therein decreases as the effective opening in the inlet 15 increases. The pressure in the first chamber 11 increases until sufficient force is present to reverse the direction of the piston 20. The reversal of direction of the piston 20 now causes the size of the other chamber 12 to decrease repeating the process described to cause the piston to oscillate. Oscillation of the piston 20, is therefore, a function of the forces generated by the fluid flow through the orifices 23, 24, which is dependent on the input pressure at inlet 16; the volume of fluid in chambers 11 and 12; the mass of the cylinder 20; and the effective openings in outlets 14, 15. Since the oscillations are a function of the input pressure at inlet 16, changes in input pressure will cause a change in the oscillations, making the oscillator useful as an analog to frequency converter.

The center frequency ($f_c$), i.e. the frequency of oscillations of the piston 20 when the housing is at rest and the piston 20 is oscillating centrally of the housing cavity 3, can be approximated by the following equation:

Equation No. 1

$$f_c = \left[ \frac{b_1(t_1+t_2) + b_2(t_1+t_2)}{M/A(t_1+t_2)} \right] 1/2$$

where: $M$ is the mass of the cylinder 20;

$A$ is the area of the cylinder ends in contact with the fluid chambers 11 and 12;

$b_1$ and $b_2$ are functions quiescent pressure and cylinder displacement relative to the chambers 11 and 12

$t_1$ is the time required to fill the volume caused by the displacement of cylinder 20;

$t_2$ is the time required to compress the fluid as a result of the displacement of the cylinder 20.

$t_1$ and $t_2$ are a function of the magnitude (L, not shown) of displacement of cylinder 20; the opening of the housing outlets 14, 15; the volume of fluid in the chambers 11, 12 under pressure; and the quiescent pressure of the fluid in the chambers 11, 12. The oscillator may also be used as an accelerometer if the oscillator is designed so that cylinder 20 is responsive to outside forces, e.g. acceleration of the housing. The dynamic characteristics of the oscillator, when it is used as an accelerometer, can then be approximated by the following fourth order equation:

Equation No. 2

$$\frac{\text{Frequency}}{\text{Load (g.)}} = \frac{\frac{M}{A}(1+t_1S)(1+t_2S)}{A_4S^4 + A_3S^3 + A_2S^2 + A_1S^1 + A_0}$$

Where the coefficients of the S terms, $A_0, A_1, A_2, A_3$, and $A_4$ are also functions of $t_1, t_2, M$, and quiescent values of pressure.

EXAMPLE 1

A device built on the above principles was subjected to known values of acceleration and a characteristic curve of frequency versus gravity was obtained. With this information, it was then possible to determine the acceleration of a moving body (to which the device was attached or part of) by measuring the frequency and from the graph determining the acceleration.

The following are some of the important considerations in designing the oscillator for use as an accelerometer. First, to assure that the oscillator would continue to oscillate when subjected to outside forces, the displacement time constant ($t_1$) was made smaller than the the compressibility time constant ($t_2$). This was accomplished by making the orifice diameter ($d$) of outlets 14 and 15 small in comparison to the bearing length $D$. The ratio of outlet orifice sized to the bearing distance $D$ should be less than 0.01 (preferably $d/D \approx 1/150$). Second, the oscillator was also designed slightly unsymmetrical to assure starting oscillations.

The fluid oscillator, designed within these parameters operates as an accelerometer as follows: When the oscillator is accelerated in a direction parallel to the axis of the cylinder 20 (seismic mass), the cylinder will shift from its centered position, changing the effective volumes of chambers 11 and 13, which further causes the frequency of oscillations to change. This change in frequency ($\Delta f$) is a function of of the displacement magnitude "L," not shown) of the cylinder 20 due to acceleration; the nominal or effective opening ($d$) in the outlets 14, 15 and may be expressed as $\Delta f = L/d$. Typically, the change in frequency ($\Delta f$) due to acceleration will be approximately one-fifth to one-half the center frequency ($f_c$, Equation 1).

Although the device shown is generally asymmetrical to obtain a symmetrical output (e.g., at +1 $\Delta f$=280 Hz.; at −1 g., $\Delta f$=280 Hz.), the device may be built asymmetrical (having a built-in bias) so that the frequency response to equal, but opposite acceleration forces, is not the same (e.g., at +1 g., $\Delta f$= 280 Hz.; at −1 g., $\Delta f$=230 Hz.).

While I have disclosed a preferred embodiment of my invention, it will be apparent to those skilled in the art that changes may be made to the apparatus described without departing from the spirit of the invention, as set forth in the appended claims and, in some case, certain features of the invention may be used to advantage without corresponding use of other features. For example, there may be more or less than the number of inputs and outputs shown; their arrangement may also be changed so long as the effective opening of either the input or output varies as a function of the movement of the piston so that as fluid passes through the housing chamber the pressure fluctuates, causing the piston to oscillate. Accordingly, it is intended that the illustrative and descriptive materials employed herein be used to illustrate the principles of my invention and not to limit the scope thereof.

Having described my invention, I claim:

1. A fluid oscillator which comprises:
a housing having a cavity, a first inlet for receiving fluid, and a first and second outlet for exhausting fluid, each of said outlets having an opening in the wall of said housing cavity; and
means for dividing said cavity into a first and second chamber, said first chamber communicating with said housing first outlet and said second chamber communication with said housing second outlet, said dividing means having a first passage which communicates with said housing inlet and a second passage which communicates with said first passage and said first and second chambers, said dividing means movably disposed adjacent said outlets for movement past said outlet openings to vary the size of the openings when said dividing means moves, whereby fluid enters said housing inlet flows into said first passage, out of said second passage into said chambers and out of said chambers through said outlet openings which vary in size with the movement of said dividing means, thereby changing the rate of fluid flow from the first and second housing outlets.

2. A fluid oscillator which comprises:
a housing having an interior chamber, input means for receiving fluid, and a first and second outlet means for exhausting fluid, each of said outlet means having an opening in the wall of said interior chamber; and
a body located within the chamber of said housing, said body having a radial and axial passage, said radial passage communicating with said axial passage and said input means of said housing, said axial passage extending through said body, said body movably disposed adjacent said outlets for movement past said outlet openings to vary the size of the openings when said body moves whereby fluid entering said housing input means flows into said radial passage in said body, out of said body by said axial passage and out of said chamber through said outlet openings which vary in size with the movement of said body, thereby producing a fluid flow from said housing outlet means which varies as a function of the oscillations of said body.

3. A fluid oscillator as recited in claim 2 wherein said output means for said housing comprises two outlets spaced from each other so that the two output signals therefrom are 180° out of phase.

4. A fluid oscillator as recited in claim 3 wherein said body has a fluid step bearing which communicates with said radial passage and said housing input means so that said body floats within the chamber when fluid passes through the housing.

5. A fluid oscillator as recited in claim 3 wherein the shape of the housing chamber and the shape of the body within the chamber is cylindrical.

6. A fluid oscillator as recited in claim 2 wherein said body has a fluid step bearing so that said body floats within the chamber when fluid passes through the housing.

7. A fluid oscillator as recited in claim 6 wherein the shape of the housing chamber and the shape of the body within the chamber is cylindrical.

8. A fluid oscillator as recited in claim 7 wherein the shape of the housing chamber and the shape of the body within the chamber is cylindrical.

9. A fluid oscillator as recited in claim 2 wherein the shape of the housing chamber and the shape of the body within the chamber is cylindrical.

* * * * *